United States Patent [19]

Fix

[11] 4,165,906
[45] Aug. 28, 1979

[54] TRACK SHOE HAVING REPLACEABLE PAD

[75] Inventor: Joseph O. Fix, Maybee, Mich.

[73] Assignee: The United States of America as represented by the Secretary of the Army, Washington, D.C.

[21] Appl. No.: 878,036

[22] Filed: Feb. 15, 1978

[51] Int. Cl.$^2$ .............................................. B62D 55/28
[52] U.S. Cl. ............................................................ 305/51
[58] Field of Search ..................... 305/51, 55, 54, 46, 305/40, 42, 38, 36, 35 R

[56] References Cited

U.S. PATENT DOCUMENTS

| | | | |
|---|---|---|---|
| 2,686,697 | 8/1954 | Baker | 305/35 R |
| 2,869,932 | 1/1959 | Eichweber | 305/51 |
| 4,068,905 | 1/1978 | Black et al. | 305/51 |

FOREIGN PATENT DOCUMENTS

| | | | |
|---|---|---|---|
| 1035422 | 4/1953 | France | 305/51 |
| 1543262 | 9/1968 | France | 305/38 |
| 447519 | 4/1949 | Italy | 305/51 |

Primary Examiner—John P. Shannon
Attorney, Agent, or Firm—Peter A. Taucher; John E. McRae; Nathan Edelberg

[57] ABSTRACT

An endless track for a tracked vehicle comprising a series of track shoes, each having a cavity therein for removable reception of an elastomeric terrain-engaging pad or removable grouser, each pad or grouser being locked within its cavity by a mechanism which includes a swingable latch element having an inturned free end adapted to hook over one edge of the shoe to prevent outward dislocation of the pad from the cavity.

6 Claims, 10 Drawing Figures

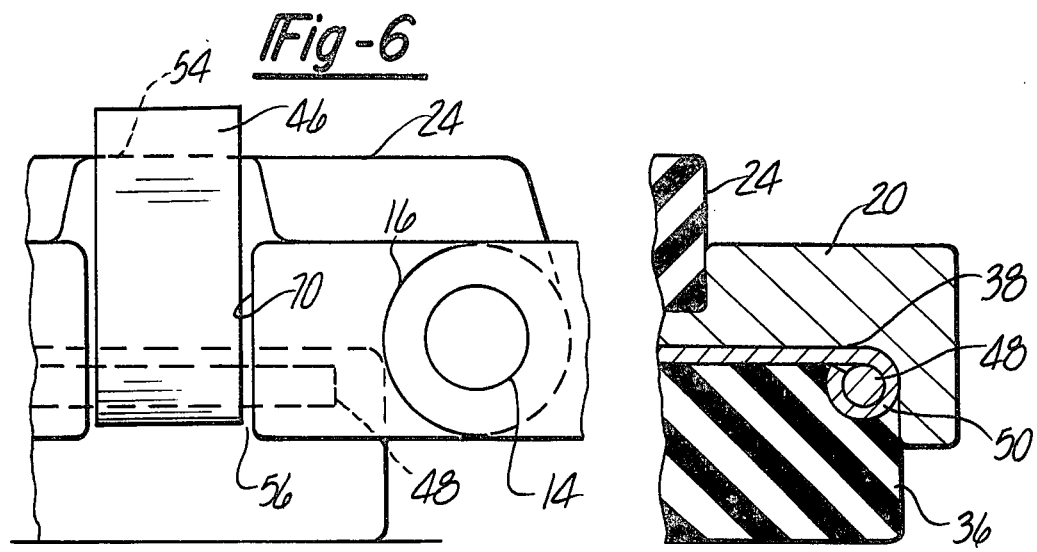
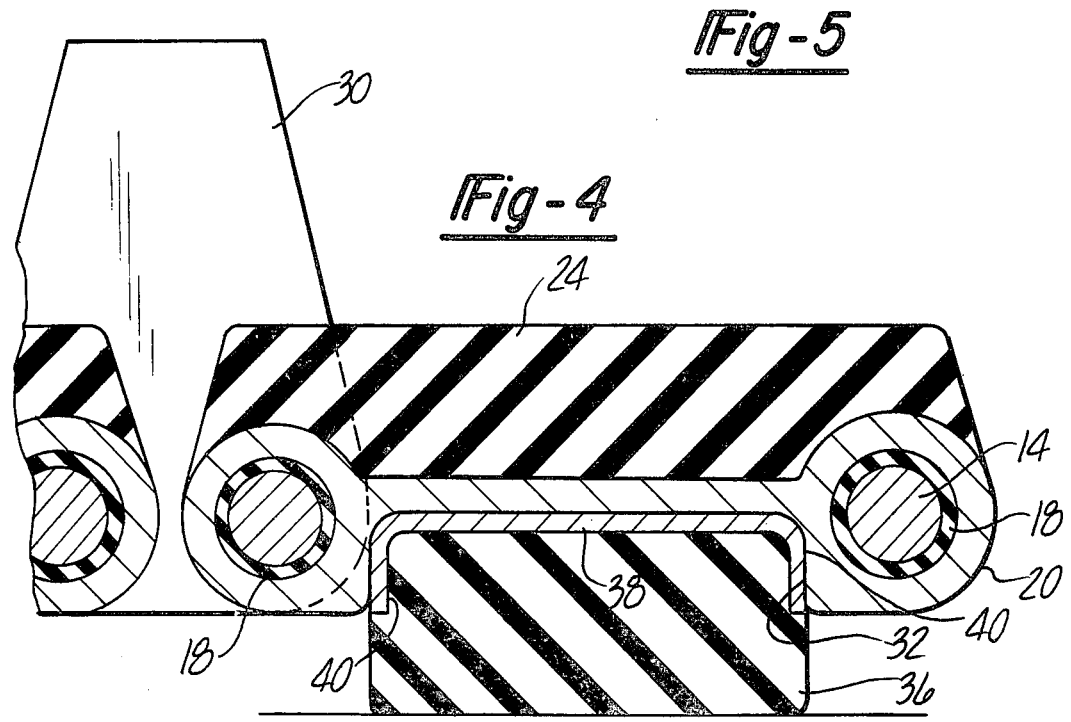
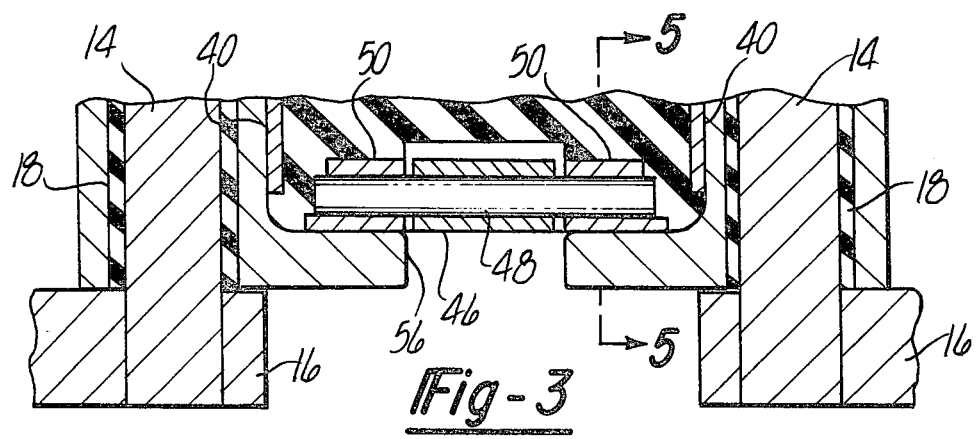

TRACK SHOE HAVING REPLACEABLE PAD

The invention described herein may be manufactured, used, and licensed by or for the Government for governmental purposes without payment to me of any royalty thereon.

BACKGROUND AND SUMMARY OF THE INVENTION

This invention relates to a track shoe-resilient pad assembly of the general type shown in U.S. Pat. No. 2,686,697 issued to M. P. Baker on Aug. 17, 1954. The present invention is directed particularly to a pad lock-in latch configuration and location that is believed to eliminate certain problems associated with the latch construction used in the aforementioned Baker patent. A particular object of the invention is to provide a latch construction that is remote from the terrain-engagement surface of the pad, thereby minimizing the tendency for dirt, rocks, etc. to clog or wear out the latch mechanism, as by abrasion.

THE DRAWINGS

FIG. 3 is a fragmentary sectional view taken on line 3—3 in FIG. 2.

FIG. 4 is a sectional view taken on line 4—4 in FIG. 2.

FIG. 5 is a fragmentary sectional view taken on line 5—5 in FIG. 3.

FIG. 6 is a right end elevational view of the track section shown in FIG. 2.

Figure 1:
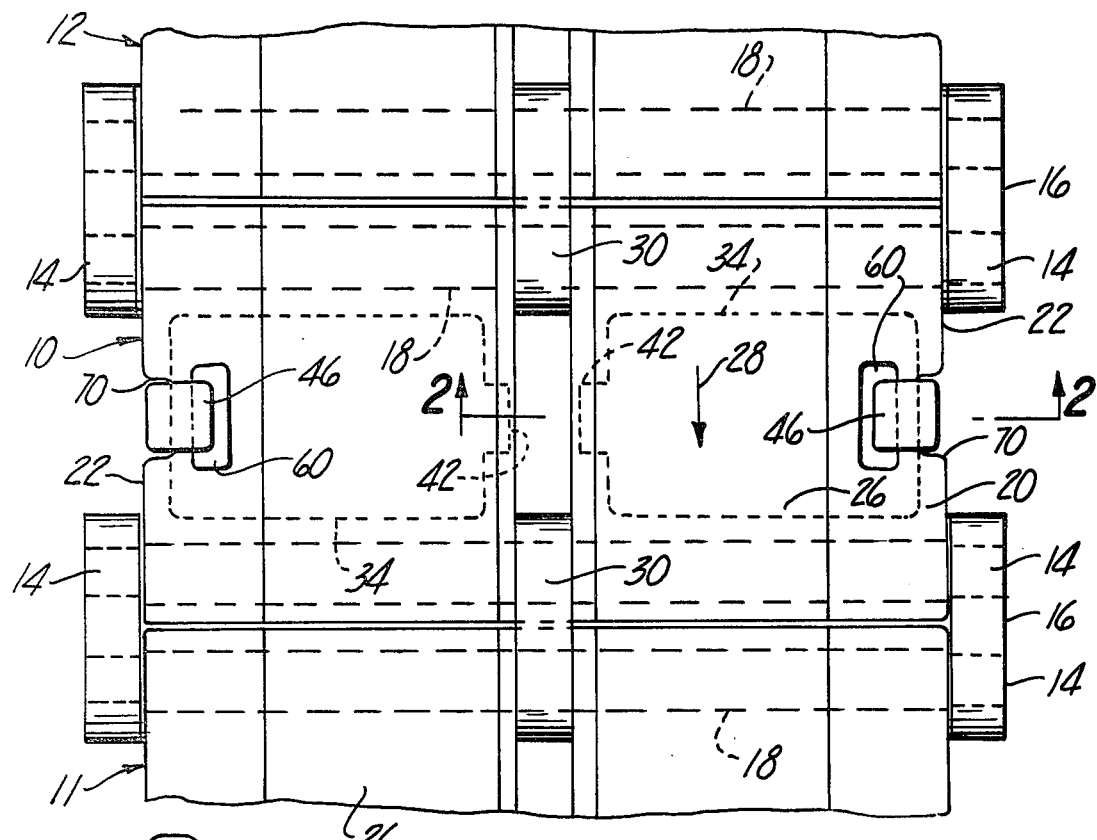
FIG. 1 is a top plan view of one section of an endless track embodying this invention.

Referring particularly to FIG. 1, there is shown in top plan one complete track section 10, and fragmentary portions of two adjacent track sections 11 and 12. The track sections are identical. Each track section comprises two metal shoes 20 arranged in side-by-side relation, and two cylindrical pins 14 extending transversely therethrough near their opposite ends. The ends of these pins extend into connectors 16 that serve as hinge linkages between the track sections. As best seen in FIG. 4, each pin 14 is surrounded by a conventional rubber bushing 18 within a transverse bore in the track shoe 20. The ends of pins 14 extend laterally beyond the outer side surfaces 22 of the shoes 20 into anchorages within links 16 in known fashion.

Each track shoe 20 is a metallic casting or forging having a non-metallic insert 24 bonded to one of its major surfaces; usually the insert is a high durometer elastomer. Each insert 24 presents an exposed resilient shoe surface 26 to the non-illustrated road wheels. Such road wheels move over resilient surfaces 26 along the pathline denoted generally by numeral 28 (FIG. 1); the road wheels are grooved in conventional fashion for guidance in the correct path by means of upstanding prongs 30 carried by intermediate connector links 16a.

Figure 8:
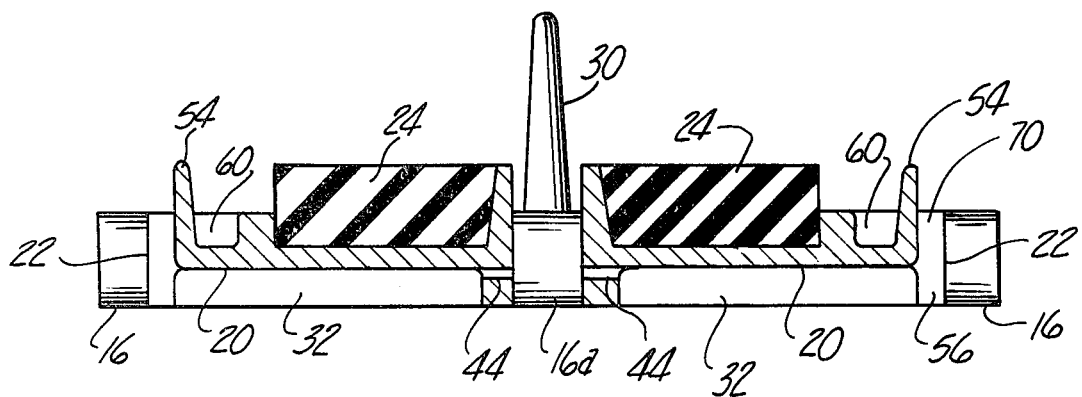
FIG. 8 is a view illustrating a track section with the terrain-engagement pad removed.

The major face of each shoe 20 remote from insert 24 is recessed to form a rectangular cavity denoted generally by numeral 32, said cavity being dimensioned to snugly but removably receive a terrain-engagement pad 34; for visualization purposes I show in FIG. 8 the shoes 20 with pad 34 removed from each cavity 32. When the track is used on a military vehicle the pads 34 would be removed (as shown in FIG. 8) to give the track aggressive action in difficult terrain; the pads 34 are installed when the vehicle is moving over paved roads.

Figure 2:
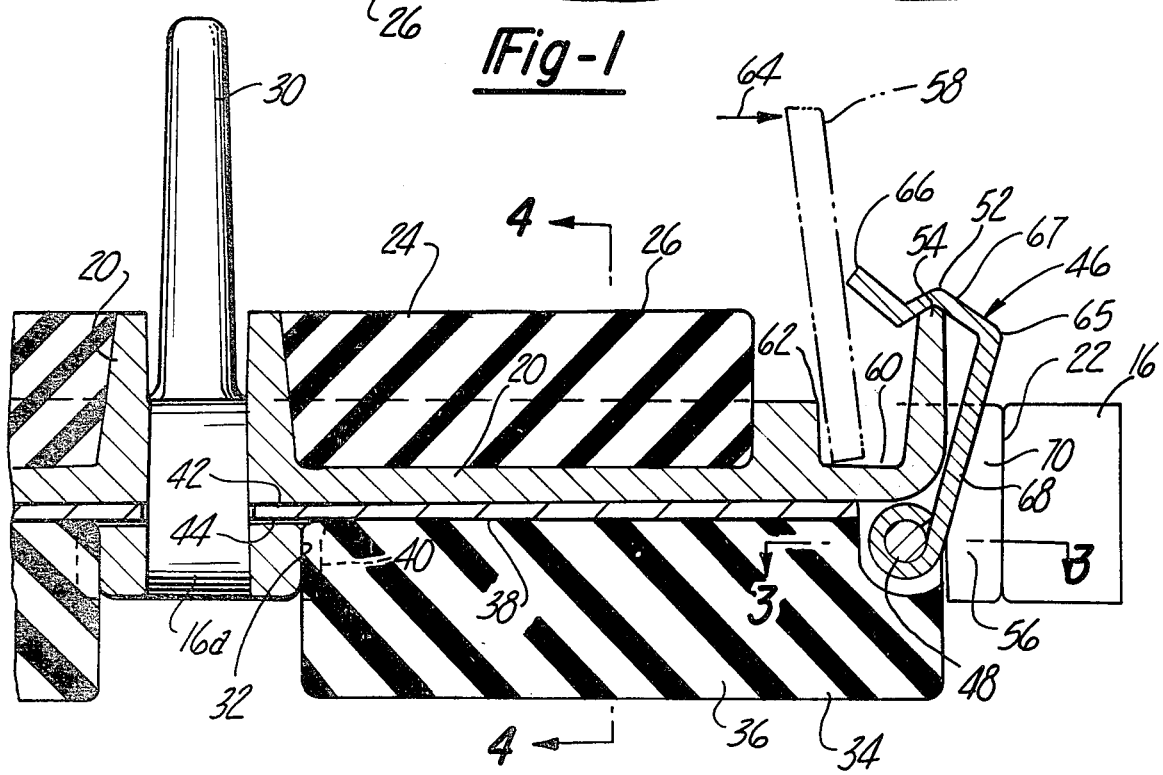
FIG. 2 is an enlarged sectional view taken on line 2—2 in FIG. 1.

As seen in FIGS. 2 and 4, pad 34 comprises a resilient elastomeric body 36 bonded to a metallic plate 38, said plate having downwardly extending flanges 40 on each of its four edges, said flanges being bonded to the elastomeric body 36 to provide dimensional stability to the pad, whereby the pad will be snugly seated within cavity 32 without tendency for the elastomer to have unwanted movement of the pad in the cavity. Thus, the pad is rigidly attached to the shoe 20 during service, but is easily removed from the cavity when it becomes necessary to replace a worn-down pad with a new pad. The pad is of course constructed to be thicker than the depth of the cavity so that the terrain (or pavement) contacts the exposed major face of the pad rather than the face of the shoe.

As best seen in FIG. 2, an inner edge area of plate 38 is extended laterally beyond the edge of elastomer 36 to form a tab 42. The tab is adapted to fit into a slot 44 in shoe 20, thereby retaining the inner portion of pad 34 against displacement out of the cavity. The outer portion of pad 34 is retained against displacement from cavity 32 by means of a swingable latch element 46, said latch element having one of its ends curled around a hinge pin 48 that is suitably anchored within pad 34; the latch element is thus free to swing around the pin 48 axis. As best shown in FIGS. 3 and 5, pin 48 is anchored within pad 34 by two curved flanges 50 that extend from plate 38 around the pin surface. Other methods of anchoring the pin can be visualized.

FIG. 2 shows latch element 46 in its locked position wherein its free end 52 is hooked over an edge 54 of shoe 20; the aforementioned cavity 32 completely surrounds the side surfaces of pad 34 except that a notch 56 in the shoe communicates cavity 32 with shoe outer side surface 22. Therefore latch element 46 can swing within notch 56 around the axis of hinge pin 48 between the FIG. 2 locked position and the FIG. 7 unlocked position.

FIG. 2 shows in phantom lines a lever or prying element 58 extending into a socket 60 in the face of shoe 20 to abut the defined fulcrum point 62. A rightward manual force on lever 58 in the direction of arrow 64 causes lever 58 to exert a rightward prying force on the tip 66 of latch element 46, thereby causing hooked portion 52 of the latch element to spring off edge 54 of the shoe to the condition shown in FIG. 7. Thereafter pad 34 can be removed from cavity 32 by a combined tilting and translating motion similar to that shown in FIG. 5 of the aforementioned U.S. Pat. No. 2,686,697. The aforementioned fulcrum point 62 is preferably located approximately on an imaginary line that is normal to the major surface of shoe 20 and intersects the extreme tip 66 of the latch element when said element is in the FIG. 2 locked position. This relationship is believed to preposition the lever 58 in an optimum location for exerting maximum force on latch element 46 to produce desired latch-unlock action.

Figure 7:
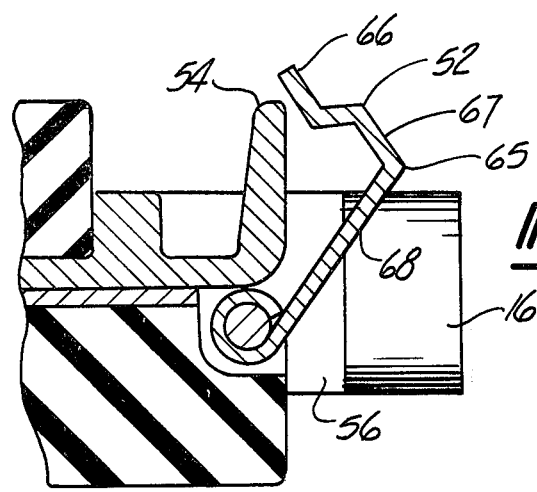
FIG. 7 is a fragmentary sectional view taken in the same direction as FIG. 2 but illustrating a latch element in an unlatched condition.

The latch is preferably moved from its FIG. 7 unlocked condition to its FIG. 2 locked condition by striking a hammer blow at point 65 on the latch element surface. Point 65 is the apex of a V comprised of intermediate walls 67 and 68. The sharp hammer blow at point 65 causes tip 66 to cam upwardly on the edge 54 of shoe 20, whereby the latch element is slightly elongated, due to a spread-apart effect on walls 67 and 68. The inturned hook portion 52 of the latch element thereby snaps over edge 54 to the condition of FIG. 2. Tip 66 acts as a cam to promote the desired climbing action of the latch over edge 54 of the shoe.

During service the endless track is driven by sprocket means (not shown) whose teeth fit into the spaces between adjacent ones of the aforementioned links 16 (FIG. 1). The teeth of the sprocket pass very closely alongside the side surfaces 22 of the shoes 20. Therefore it is necessary that each latch element 46 be located entirely inside the plane defined by the shoe surface 22 in order not to be struck by the sprocket tooth. The desired orientation of the latch element is obtained by locating said latch element within a recess 70 that extends from the aforementioned notch 56.

Figure 9:
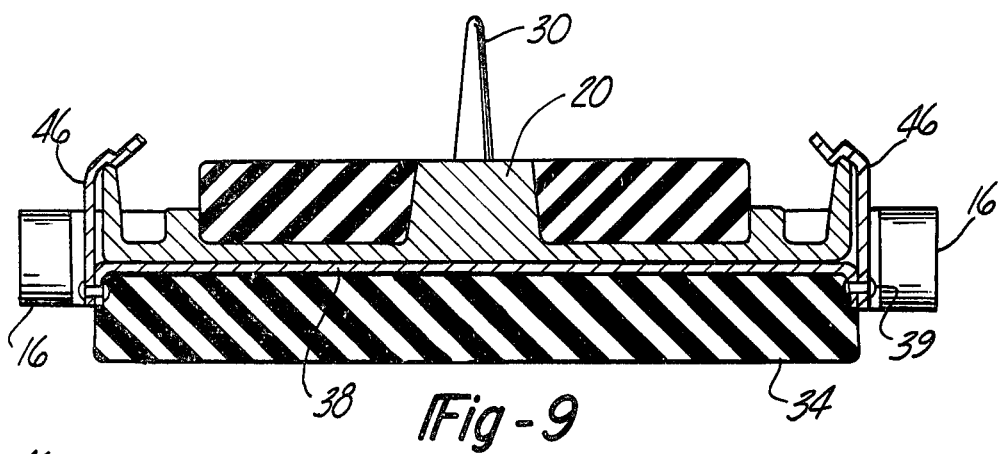
FIG. 9 is a view taken generally in the same direction as FIG. 2 but illustrating a second embodiment of the invention.
Figure 10:
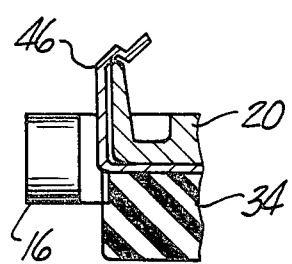
FIG. 10 is a fragmentary view illustrating a variant of the FIG. 9 embodiment.

FIG. 9 illustrates a second embodiment of the invention wherein each track section is formed by a single shoe 20 rather than two shoes as in FIG. 2. In the FIG. 9 construction the single shoe 20 is provided with a single cavity for reception of a pad 34 that extends substantially entirely across the major width of the shoe. In this case, pad 34 is retained within the shoe cavity by means of two similar swingable latches 46 constructed generally similarly to the latch 46 shown in FIG. 2. However, to illustrate different latch structure possibilities each latch is shown as a spring arm connected to the pad reinforcement plate 38 by means of a rivet or weld connection 39. FIG. 10 illustrates a variant of this arrangement wherein the latch is formed as an extension of plate 38. The operation of the FIG. 9 or FIG. 10 latch is essentially the same as the previously described latch (FIG. 2).

The illustrated latch 46 (FIGS. 2, 9 or 10) is believed to be advantageous over other known latches such as the corresponding slidable latch 46 in U.S. Pat. No. 2,686,697; the patented slidable latch has very small area contact with lip 58 so that service forces could prematurely wear the contact surfaces. Also, the patented slidable latch is believed susceptible to bending or twisting under road forces imparted to pad 44. Also, the hole 54 in the patented pad is apt to plug with dirt so that road forces acting obliquely on the dirt plug could then unlock the latch. Such road forces could also disturb the bond between the elastomer and the slidable plate 46, whereupon the plate would tend to float in an indeterminate condition. Further, it is believed that the location of the patentee's latch 46 in communication with the road surface would promote corrosion and/or deterioration of the hole area in latch plate 46, thereby interferring with the prying operation depicted in FIG. 5 of the patent. My swingable latch 46 is believed to be essentially free of difficulties associated with the patented latch.

The drawings show the invention applied to a double pin track, i.e. a track wherein each track section has two pins 14 adjacent its opposite ends. The invention also has application to so-called single pin tracks, i.e. tracks wherein each track section has only one pin near one of its ends; in such a track system the pin in one track section extends through openings in hinge lugs on the adjacent track section.

I wish it to be understood that I do not desire to be limited to the exact details of construction shown and described for obvious modifications will occur to a person skilled in the art.

I claim:

1. An endless track for a tracked vehicle, comprising a number of shoes hingedly connected together about axes extending normal to the track path; each shoe having a first major face thereof presented to the road wheels, a second major face thereof directed toward the terrain, and at least one outer side surface joining said first and second faces; each shoe having at least one cavity in its second face; an elastomeric resilient pad removably fitting within each cavity, each pad being thicker than the depth of the cavity whereby the terrain is contacted by the exposed face of the pad rather than the second face of the shoe; each cavity being remote from the outer side surface of the shoe so that the cavity side surfaces prevent the pad from shifting out of the cavity parallel to the shoe second face; and means for detachably locking each pad against movement out of the cavity normal to the shoe second face; said locking means comprising a latch element swingably connected to the pad at one of its side edges; the shoe having a notch therein connecting the cavity and the shoe outer side surface whereby the latch element is enabled to swingably move through said notch to a position extending along the shoe side surface; the free end of the latch element being inturned to hook over one edge of the shoe, thereby locking the pad within the cavity.

2. The endless track of claim 1 said first face of each shoe having a socket therein defining a fulcrum point for a lever that is used to pry the inturned end of the latch element out of locking engagement with the shoe.

3. The endless track of claim 1 said latch element being dimensioned so that when it is in the locked position the extreme tip of its free end is located approximately on an imaginary line that is normal to the first major face of the shoe and intersects the aforementioned fulcrum point.

4. The endless track of claim 1 wherein an intermediate section of the swingable latch element has a V shape, whereby a hammer blow on the apex of said V shaped intermediate section causes the arms of the V to momentarily spread apart for elongating the latch element, thereby permitting the inturned free end of the latch to climb over the edge of the shoe to a pad-locking position.

5. The endless track of claim 4 the free end of the latch element having an extreme tip (66) that is oriented to act as a cam while the latch element free end is climbing over the edge of the shoe.

6. The endless track of claim 1 the outer side surface of the shoe having a recess (70) therein communicating the aforementioned notch with the aforementioned edge of the shoe, said recess being dimensioned to receive the latch element when said element is in its locked position so that the latch element is disposed inwardly from the plane of the shoe outer surface.

* * * * *